No. 764,084. PATENTED JULY 5, 1904.
C. L. VERAC.
MONKEY WRENCH.
APPLICATION FILED SEPT. 14, 1903.
NO MODEL.
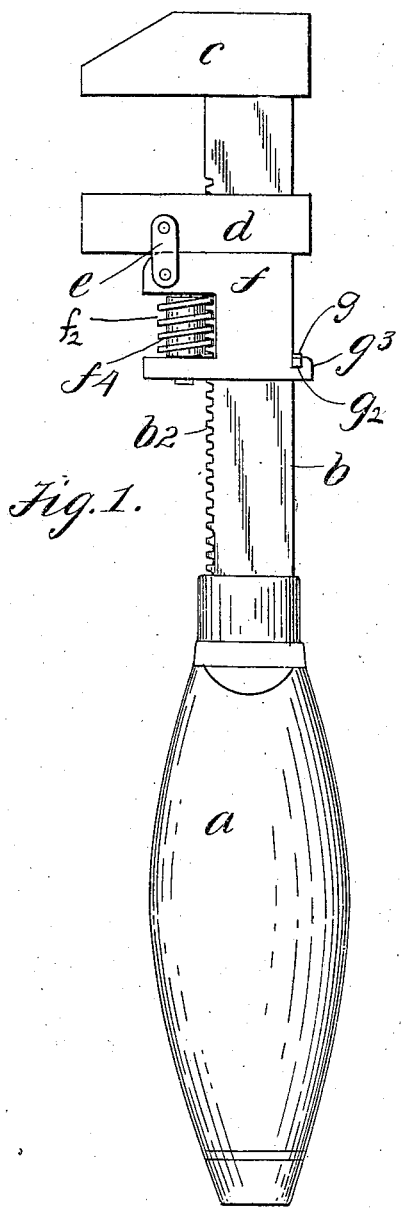
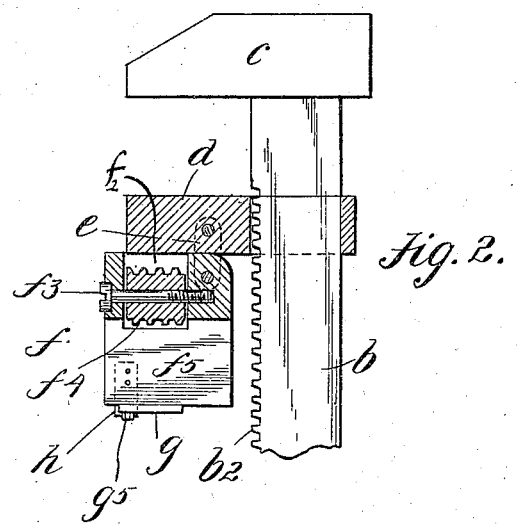
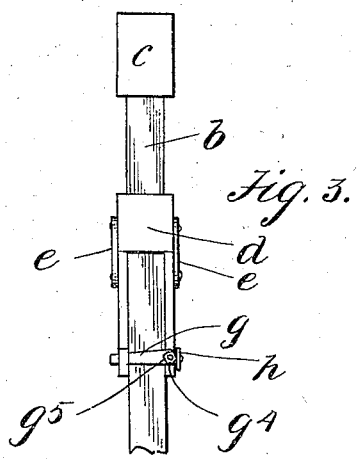
WITNESSES
INVENTOR
Charles L. Verac
BY Edgar Tate & Co
ATTORNEYS

UNITED STATES PATENT OFFICE.

CHARLES L. VERAC, OF NEW YORK, N. Y.

MONKEY-WRENCH.

SPECIFICATION forming part of Letters Patent No. 764,084, dated July 5, 1904.

Application filed September 14, 1903. Serial No. 173,069. (No model.)

*To all whom it may concern:*

Be it known that I, CHARLES L. VERAC, a citizen of the United States, residing at New York city, in the county of New York and State of New York, have invented certain new and useful Improvements in Monkey-Wrenches, of which the following is a specification, such as will enable those skilled in the art to which it appertains to make and use the same.

This invention relates to what is known as "monkey-wrenches;" and the object thereof is to provide improved means for sliding and for adjusting the movable jaw on said shank of the wrench.

The invention is fully disclosed in the following specification, of which the accompanying drawings form a part, in which the separate parts of my improvement are designated by suitable reference characters in each of the views, and in which—

Figure 1 is a side view of my improved wrench; Fig. 2, a similar view of a portion thereof and showing parts thereof in a different position and in section, and Fig. 3 a back view of the operative parts of the wrench.

In the practice of my invention I provide a wrench of the class specified which consists of a handle $a$, having the usual metal shank $b$, which is rectangular in cross-section and provided at its ends with a stationary jaw $c$. The shank $b$ is provided with the usual teeth $b^2$, at the front side thereof, and mounted on said shank is a sliding jaw $d$, which may be adjusted to any desired point on said shank.

Hinged to the jaw $d$ by means of links $e$ or in any desirable manner is a swinging member $f$, in the front portion of which is a longitudinal recess $f^2$, through which is passed and in which is secured a shaft or similar device $f^3$, on which is mounted a cylindrical worm-gear $f^4$, which is adapted to operate in one position of the swinging member $f$ in connection with the teeth $b^2$, which constitute a gear in connection with which the gear $f^4$ operates. The back portion of the swinging member $f$ is provided with a longitudinal recess $f^5$, which is adapted to receive the shank $b$ of the wrench, and pivoted to one side of the swinging member $f$, opposite the jaw $d$, is a dog $g$, the front end of which is adapted to enter a recess $g^2$, formed in a lug or projection $g^3$, which extends backwardly over the side of the swinging member $f$ opposite the point where the dog is pivoted. The dog $g$ is mounted on a pivot-pin $g^4$ and is held in place by a nut $g^5$, and secured to the side of the swinging member $f$, to which the dog $g$ is pivoted, is a spring $h$, the free end of which bears on the pivoted end of the dog $g$ and is adapted to hold it either in a closed or open position.

The swinging member $f$ may be swung backwardly into the position shown in Fig. 1 and locked in said position by the dog $g$, or said dog $g$ may be swung into the position shown in Fig. 2, when the swinging member $f$ may turn outwardly, as shown in said figure. When the swinging member $f$ is in the position shown in Fig. 2, the jaw $d$ may be slid freely on the shank $b$; but when the swinging member $f$ is locked in the position shown in Fig. 1 the jaw $d$ can only be moved on the shank $b$ by turning the worm-gear $f^4$, which is done by the thumb and finger.

It will thus be seen that the jaw $d$ may be freely slid along the shank $b$ whenever it is desired to move said jaw a considerable distance; but when it is desired to adjust the position of said jaw the swinging member $f$ is locked in the position shown in Fig. 1, in which position the jaw $d$ can only be adjusted by means of the worm-gear $f^4$, as hereinbefore described.

Having fully described my invention, what I claim as new, and desire to secure by Letters Patent, is—

1. A wrench of the class described, comprising a handle having a shank provided in the front side thereof with transverse teeth and at the end thereof with a stationary jaw, a movable jaw mounted on said shank, and a swinging member hinged to said movable jaw and having a recess which opens backwardly and is adapted in one position to inclose said shank, said swinging member being also provided with a gear adapted to engage the teeth on said shank and with means for locking it thereto, substantially as shown and described.

2. A wrench of the class described comprising a handle having a shank provided in the front side thereof with transverse teeth and at the end thereof with a stationary jaw, a movable jaw mounted on said shank, and a swinging member hinged to said movable jaw and provided with a recess which opens backwardly and is adapted to receive said shank, said swinging member being also provided with a gear adapted to engage the teeth on said shank, and with means for locking it thereto, substantially as shown and described.

In testimony that I claim the foregoing as my invention I have signed my name, in presence of the subscribing witnesses, this 12th day of September, 1903.

CHARLES L. VERAC.

Witnesses:
F. A. STEWART,
C. E. MULREANY.